Figure 1:
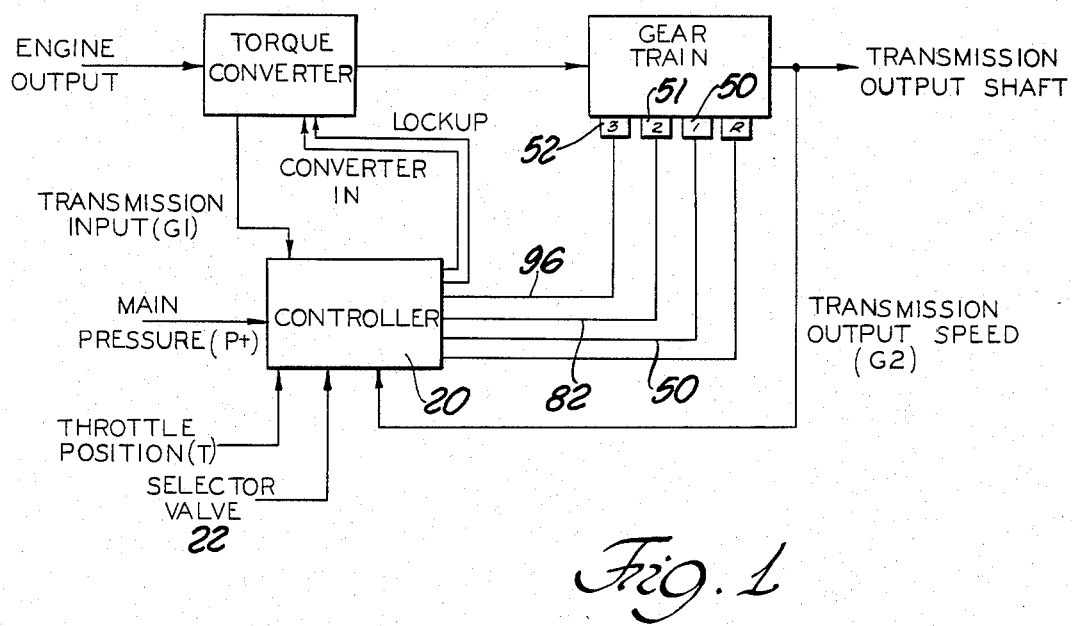

United States Patent [19]

Funke et al.

[11] Patent Number: 4,494,422
[45] Date of Patent: Jan. 22, 1985

[54] FLUIDIC TRANSMISSION CONTROLLER

[75] Inventors: Maurice F. Funke, 6891 Garland La., Columbia, Md. 21045; Joseph W. Morris, Howard County, Md.

[73] Assignee: The United States of America as represented by the Secretary of the Army, Washington, D.C. ; by said Joseph W. Morris

[21] Appl. No.: 418,858

[22] Filed: Sep. 16, 1982

[51] Int. Cl.³ ............ B60K 41/10; B60K 41/22; F15C 1/12
[52] U.S. Cl. ........................ 74/867; 74/869; 74/864; 192/3.57; 137/814
[58] Field of Search .......... 74/859, 860, 861, 863, 74/864, 865, 867, 868, 869; 192/3.57, 0.052, 0.092; 137/814, 816, 596.14

[56] References Cited

U.S. PATENT DOCUMENTS

| 2,052,869 | 9/1936 | Coanda . | |
|---|---|---|---|
| 3,683,721 | 8/1972 | Uozumi et al. | 74/868 X |
| 3,842,862 | 10/1974 | O'Keefe | 137/814 |
| 3,888,143 | 6/1975 | Kolehmainen et al. | 74/863 |
| 3,895,547 | 7/1975 | Murakami | 74/867 |
| 4,246,990 | 1/1981 | Strantz | 74/861 X |
| 4,291,595 | 9/1981 | Jelaca | 74/867 |

FOREIGN PATENT DOCUMENTS 768668 10/1980 U.S.S.R. .................... 74/867

OTHER PUBLICATIONS

Belsterling, C. A., "Fluidic Systems Design", John Wiley and Sons, New York, 1971, pp. 44-47 & 59-60.

Primary Examiner—Allan D. Herrmann
Assistant Examiner—Arthur T. Quiray
Attorney, Agent, or Firm—Peter A. Taucher; John E. McRae; Robert P. Gibson

[57] ABSTRACT

A transmission controller that includes a series of fluidic comparators receiving power signals from selected ports in a manually-actuable range selector valve. Hydraulic signals representing engine throttle position and transmission output speed are beamed against each comparator main flow stream to switch the flow between a primary collector port and alternate collector port. Comparator outputs are amplified and applied to the end faces of spool valves that provide hydraulic actuator force for the transmission clutches.

5 Claims, 3 Drawing Figures

FLUIDIC TRANSMISSION CONTROLLER

GOVERNMENT INTEREST

This invention was conceived under Government contract DAAK30-78-C-0094 awarded by U.S. Army Tank-Automotive Research and Development Command. The Government has rights in the invention. The invention described herein may be manufactured, used, and licensed by or for the Government for governmental purposes without payment to me of any royalty thereon.

BACKGROUND AND SUMMARY OF THE INVENTION

This invention relates to automatic transmission for truck-automotive engines, especially hydraulic controllers for such transmission. An object of the invention is to utilize fluidic circuits in the controllers, to thereby eliminate some of the disadvantages of conventional moving-part valve systems, such as valve wear, necessity for complete controller redesign for each engine-transmission match up, very close tolerances on certain valve components, and valve parts complexity. As applied to military equipment, the invention seeks to provide a controller design that can be tailored to use with a large number of engine-transmission arrangements, to thus achieve a reduction in repair parts inventory at the military depots.

THE DRAWINGS

FIG. 1 diagrammatically illustrates a conventional transmission suited to the use of my invention.

Figure 2:
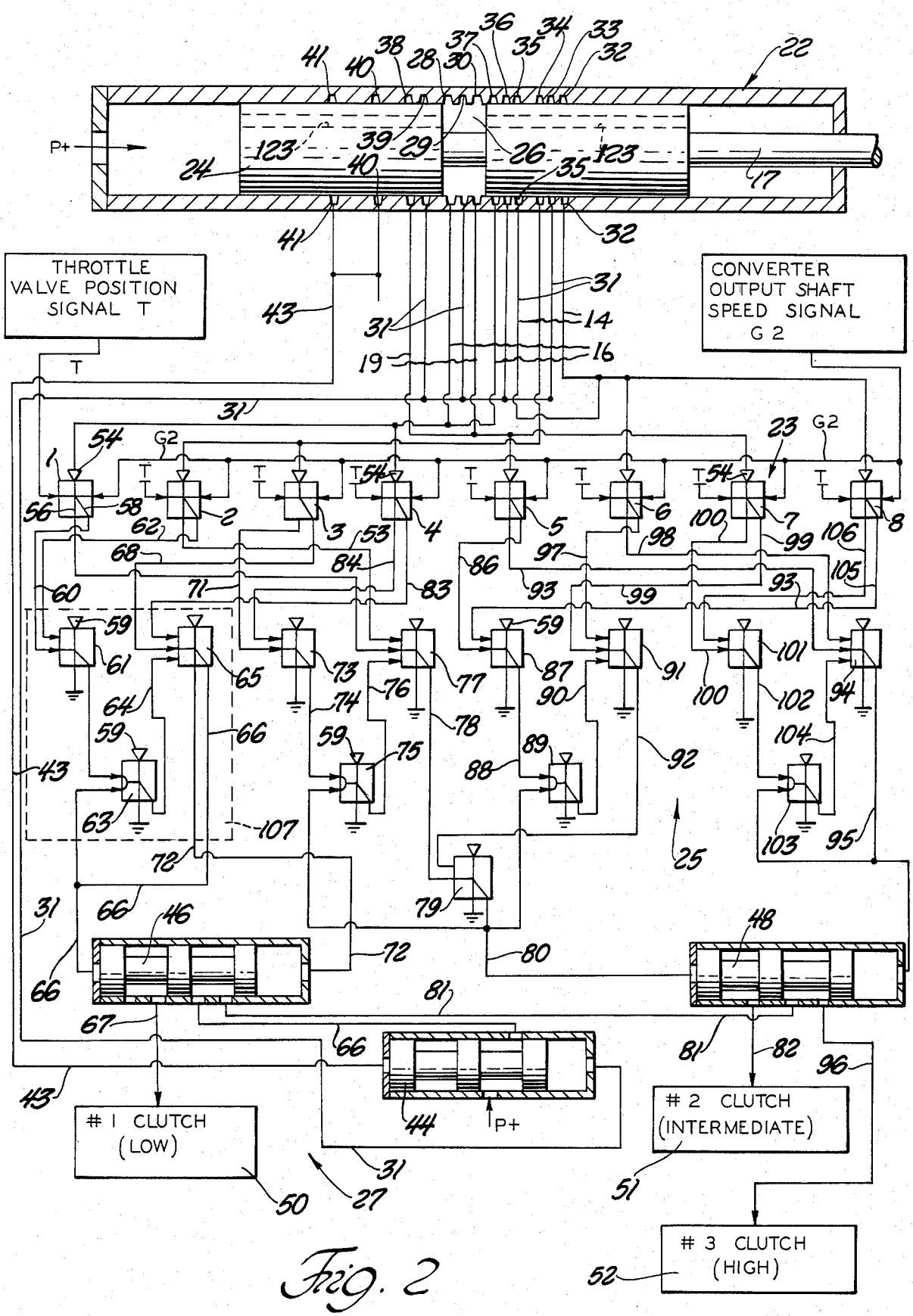

FIG. 2 schematically illustrates a fluidic transmission controller utilizing my invention.

Figure 3:
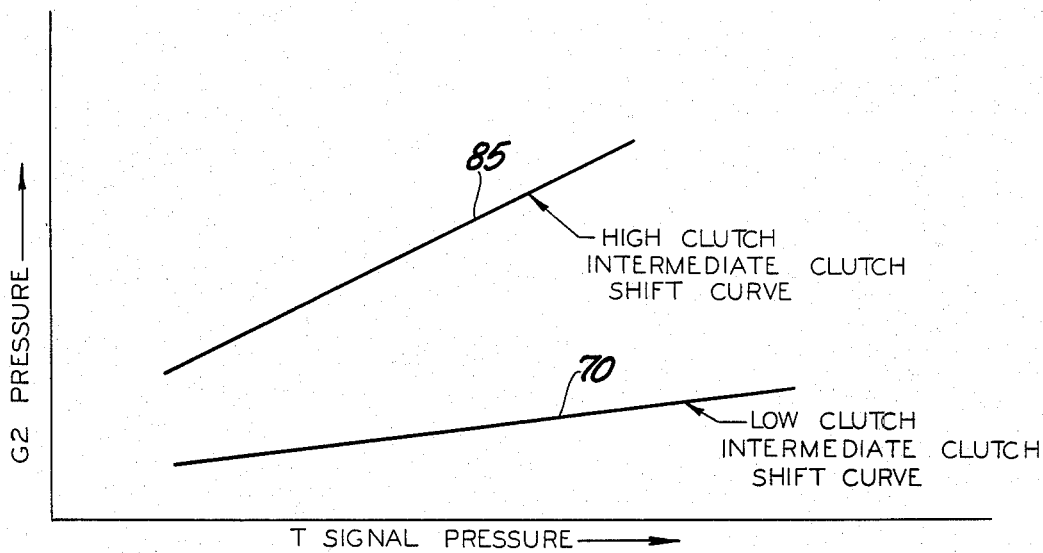

FIG. 3 is a simplified graph of a typical shift curve for the type of transmission shown in FIG. 1.

Our invention is directed especially to transmission controller 20, shown as a black box in FIG. 1. FIG. 2 generally shows the hydraulic circuitry employed in the controller. The controller can be mentally broken down into four sections based on functions performed; in FIG. 2 these four sections, numbered from the top of the FIG. to the bottom, are designated by numerals 22, 23, 25 and 27. The uppermost section 22 comprises a manually-adjustable range selector valve that provides hydraulic pressure signals representing different types of desired engine-transmission performance. Range selector signals 31 are applied to a fluidic comparator section 23 that subjects said signals to opposed deflector beams representative of engine throttle position and transmission output speed. Comparator outputs are selectively applied to fluidic amplifiers in a logic section 25, shown in the mid area of FIG. 2. Logic section 25 selects and delivers hydraulic control signals to selected valves in a spool valve section 27, shown in the lowermost portion of FIG. 2. Control signal selection automatically takes into account the setting of range selector 22 and the relative values of signals representing engine throttle position and transmission output speed. The valves in spool valve section 27 supply the brute hydraulic force necessary to operate the clutches in the transmission.

Above-mentioned range selector 22 includes a cylindrical housing connected at its left end to a regulated source of hydraulic pressure P+, which may be on the order of 100 p.s.i. Slidably disposed in the housing is a spool 24 having passages 123 for admitting the hydraulic pressure to central groove 26 in the spool. A rod 17 extends rightwardly from the spool to a nonillustrated manual actuator. In the illustrated position of spool 24 hydraulic pressure in central groove 26 is applied to three housing grooves 28, 29 and 30 which individually communicate with lines 31, 14, 16 and 19 leading to the main supply ports 54 for individual fluidic pressure comparators 1, 4, 5 and 7 in comparator section 23.

The comparator section 23 includes four other pressure comparators 2, 3, 6 and 8 arranged to have their individual main supply ports 54 connected to groove 26 at the source pressure P+ when manual selector spool 24 is in its other positions of adjustment. The following relationship apply:

| SECECTOR VALVE 24 SETTING | OPERATIVE HOUSING GROOVES | OPERATIVE FLUIDIC COMPARATORS |
|---|---|---|
| low | 32, 33, 34 | 2, 3, 6, 8 |
| low-intermediate | 35, 36, 37 | 1, 4, 6, 8 |
| normal drive | 28, 29, 30 | 1, 4, 5, 7 |
| overdrive | 28, 29, 30 | 5, 7 |
| reverse | 40 | none |
| neutral | 41 | none |

It will be seen that valve 24 has six different adjusted positions, as designated in the left hand column of the above chart. In the reverse or neutral positions of valve 24 the housing groove 40 and 41 pressurizes line 43 which leads to the left end face of spool valve 44. Spool 44 is shifted rightwardly so that pressure source P+ is isolated from line 66. In that position of spool 44 none of the three clutches 50, 51 or 52 is supplied with hydraulic actuation power. Also, in the neutral and reverse positions of range selector valve 24 none of the comparators in comparator section 23 is operative. Each of the eight comparators in section 23 controls a different downshift or upshift function, i.e. upshift from the low clutch 50 to the intermediate clutch 51 or downshift from high clutch 52 to intermediate clutch 51. Actual brute pressure force for clutch actuation is provided by spool valves 44, 46 and 48 in spool valve section 27.

Spool valve 44 is controlled by aforementioned line 31. Line 31 extends from the aforementioned range selector 22 to the right end of spool valve 44; when the range selector valve 24 is in any of the four forward drive positions the pressure in line 31 moves spool 44 to its illustrated position, whereby supply pressure P+ is communicated to one or both of the other spool valves 46 and 48 in spool valve section 27. The individual positions of the various spools 44, 46 and 48 determine which ones of the transmission clutches are engaged or disengaged.

Each comparator 1 through 8 is preferably a laminar proportional amplifier that functions in both the turbulent and laminar regions according to the beam deflection principle. Laminar proportional amplifiers are preferred over Coanada wall attachment devices because the threshold of operation of the Coanada wall attachment device, i.e. the minimum temperature for a given hydraulic oil for which the device will cease to operate, is considerably higher than that of the laminar proportional type.

"The general features of amplifiers operating on the beam deflection principle are described in a book entitled "Fluidic Systems Design," authored by Charles A. Belsterling and published by John Wiley and Sons, Inc., copyrighted 1971; see especially pages 44 through 47.

The general features of Coanda wall attachment devices are described in this same book "Fluidic Systems Design" at pages 59 and 60. The Coanda effect is also described in U.S. Pat. No. 2,052,869."

Each laminar proportional amplifier includes a main power supply port 54, two beam deflector supply ports receiving hydraulic signals T and G2, a primary collector port 56 and an alternate collector port 58. Although not shown in the drawing, each collector port 56 or 58 has an associated vent leading back to reservoir pressure to take care of potential overfill situations that would cause loss of fluid direction through the system, i.e. flip-flop action. These vents are necessary in the fluidic logic elements that feed the spool valves in order to provide a flow path for the hydraulic fluid, since the spool valve represents a blockloaded condition and the fluidic devices are flow devices. Flow from the applicable comparator 1, 2, 3 etc., is switched between the primary collector port 56 and alternate collector port 58 according to the relative magnitudes of the deflector beams provided by signals T and G2. A given comparator is effective only when its supply port 54 receives a signal from selector valve 24.

The general arrangement shown in FIG. 2 may be used with a number of different engine-transmission arrangements. However, for any particular transmission it will be necessary to tailor the fluid circuitry so that a particular upshift or downshift action occurs when conditions are above or below the shift curve, i.e. the curve that plots throttle valve signal T against transmission signal G2. The circuit tailoring involves the introduction of flow impedances into the branch lines for signals T and G2 going to the individual comparators. The flow impedance for any given branch is selected to provide comparator switching of the flow from primary collector port 56 to alternate collector port 58 at or near a specific point on the related shift curve. The construction of each impedance (restrictor) should include materials and configurations that counteract undesired flow variations due to temperature-viscosity effects.

Referring to amplifier section 25, each individual beam type amplifier has its pressure supply port 59 connected to the aforementioned pressure source P+. By way of describing the operation of amplifier section 25 I will here indicate the general effect produced by a switchover in the output from each comparator 1 through 8.

With selector 22 in the normal drive position or low-intermediate drive position, comparator 1 is operative. At values of signals T and G2 below curve 70 (FIG. 3) comparator 1 switches the flow to alternate collector port 58, thereby pressurizing line 60. This action causes amplifiers 61 and 63 to sequentially pressurize line 64. Line 64 pressure causes amplifier 65 to pressurize line 66, which shifts spool 46 rightwardly. A hydraulic clutch actuation path is provided from spool 44 through line 66, spool 46 and line 67 to low clutch 50.

With range selector 22 in the low drive position comparator 2 is operative. At values of signals T and G2 below curve line 70 comparator 3 pressurizes line 68, which operates amplifier 65 to the previously-described low clutch-actuate condition. At values of T and G2 above curve line 70 comparator 3 pressurizes line 71 which causes amplifier 73 to pressurize line 74. Amplifier 75 is actuated to pressurize line 76, thereby operating amplifier 77 to the above-described condition for establishing an actuation path to clutch 51.

With range selector 22 in the low-intermediate or normal drive positions comparator 4 is operative. At signal values below curve line 70 (FIG. 3) comparator 4 pressurizes line 83, which causes amplifier 65 to switch over to the low clutch-actuate condition. Signal values above curve line 70 enable comparator 4 to pressurize line 84, which causes amplifier 73 to switch over to the intermediate clutch-actuate condition.

With range selector 22 in the normal drive or overdrive positions comparator 5 is operative. Signal values below curve line 85 (FIG. 3) enable comparator 5 to pressurize line 86, which enables amplifier 87 to pressurize line 88. Amplifier 89 pressurizes line 90 which enables amplifier 91 to pressurize line 92. Amplifier 79 pressurizes line 80 which shifts spool 48 to the intermediate clutch-actuate position. High signal values above curve line 85 enable comparator 5 to pressurize line 93 which switches amplifier 94 to a position for pressurizing line 95 and the right end face of spool 48. An actuation path for high clutch 52 is established through line 81, spool 48 and line 96.

With range selector 22 in the low drive or low-intermediate drive positions comparator 6 is operative. At low signal values below curve line 85 (FIG. 3) comparator 6 pressurizes line 97, thereby operating amplifier 91 to the intermediate clutch-actuate condition. At signal values above curve line 85 comparator 6 pressurizes line 98, which operates amplifier 94 to the high clutch-actuate condition.

With range selector 22 in the normal drive or overdrive positions comparator 7 is operative. At signal values below curve line 85 comparator 7 pressurizes line 99, which switches amplifier 91 to the intermediate clutch-actuation condition. At signal values above curve line 85 comparator 7 pressurizes line 100, which causes amplifier 101 to pressurize line 102. Amplifier 103 thereby pressurizes line 104, which operates amplifier 94 to the high clutch-actuate condition.

With range selector 22 in the low drive or low-intermediate drive range comparator 8 is operative. At signal values below curve line 85 (FIG.3) comparator 8 pressurizes line 105, which causes amplifier 87 to pressurize line 78. Amplifier 79 pressurizes line 80 to thereby shift spool 48 to the intermediate clutch-actuate condition. At signal values above curve line 85 comparator 8 pressurizes line 106, which operates amplifier 101 to the condition for establishing an actuation path for high clutch 52.

It should be understood that the values for signals T and G2 are different for the various different comparators 1 through 8, in accordance with desired shift points along curve lines 70 and 85. Signals T and G2 in the various branch lines can be adjusted by incorporating differently sized restrictors in the different branch lines. In some cases the T signal or G2 signal can be effectively increased or varied by connecting the branch line to an auxiliary regulated pressure source of fluid sink.

Actual fluidic circuit hardware may be modularized into a number of similarly constructed units or modules. Dashed line 107 outlines one such unit that may be duplicated to build up the complete fluidic amplifier system. A certain type of modularization may also be achieved by using the same spool valve structure for each of the spool valves 44, 46 and 48 in the spool valve section. It thus becomes feasible to provide depot repair parts for a variety of different transmission controllers, using common components for each.

During a shift action excessive clutch wear and shift shock action may be minimized by the use of trimmer valves. Such valves modulate hydraulic flow to the clutch during the time that the clutch piston is moving toward a clutch-engaged position. As the piston nears its final position the actuating pressure P+ is reduced to somewhat reduce the flow and prevent shock forces. We contemplate that conventional trimmer valves using spring-urged flow regulator components could be replaced by a fluidic vortex valve arranged to control the actuating pressure P+ by varying the drain rate for one of the fluid outputs from a fluidic comparator located in the P+ pressure control circuit. My aim is to eliminate the conventional moving-part valves wherever possible.

Transmission performance is improved by the addition of lockup devices in the torque converter section. Fluidic comparators and amplifiers constructed generally similarly to the devices shown in FIG. 2 can be incorporated into the FIG. 1 controller to achieve torque converter lock-up action. Fluid forces for controlling the lock-up action are the aforementioned throttle position signal T and a pressure signal G1 representing front governor pressure at the transmission input section. An increaseing G1 signal is used to initiate the lock-up action.

We wish it to be understood that we do not desire to be limited to the exact details of construction shown and described for obvious modifications will occur to a person skilled in the art.

We claim:

1. A fluidic transmission controller comprising a range selector valve (22) having a plurality of selectively energized output signal lines; a fluidic comparator module (23) that includes a plurality of similar comparators; each comparator comprising a main supply port (54) connected to selected ones of the aforementioned signal lines, a primary collector port (56), an alternate collector port (58), one deflector beam port receiving a pressure signal T related to engine throttle position and a second deflector beam port receiving a pressure signal G2 related to transmission output speed; a fluidic logic section (25) that includes a series of similar modules (107), each logic module comprising a plurality of beam deflection type amplifiers; selected amplifiers in the individual modules (107) having beam deflector ports receiving individual output signals generated by the comparators in the fluidic comparator module (23); and a clutch-control spool valve section (27) that includes a number of similarly constructed spool valves having control faces communicating with control signals generated by selected ones of the modules in said logic section (25).

2. The controller of claim 1; the spool valve section including a spool valve (44) having one of its end faces connected with a pressure signal (43) generated by the range selector valve when said selector valve is in its neutral drive setting.

3. The controller of claim 1; the deflector beam ports for the individual comparators having restrictors associated therewith for individually adjusting the pressure values of the associated beams so that each comparator switches its primary flow between the primary collector port and the alternate collector port at a particular point along an experimentally derived transmission shift curve plotting the T signal against the G2 signal.

4. The controller of claim 1; the spool valves in the spool valve section being similarly constructed and sized, each valve spool being entirely controlled by hydraulic pressure forces on its end faces.

5. The controller of claim 1; each module (107) in the logic section comprising three fluidic amplifiers, two of said amplifiers receiving multiple deflector signals generated by comparators in said module (23), the third amplifier being controlled by outputs from said first two amplifiers.

* * * * *